Patented Feb. 3, 1931

1,791,301

UNITED STATES PATENT OFFICE

JOSEPH G. DAVIDSON, OF YONKERS, NEW YORK, ASSIGNOR TO CARBIDE AND CARBON CHEMICALS CORPORATION, A CORPORATION OF NEW YORK

SOLUTION OF CELLULOSE DERIVATIVES

No Drawing. Application filed May 19, 1926, Serial No. 110,286. Renewed August 12, 1929.

The invention relates to solutions of cellulose derivatives such as the cellulose esters and ethers, and comprises a group of novel solvents adapted for the preparation of such solutions.

The solvents embraced by the invention are chemical compounds having as the nucleus of the molecule a glycol group

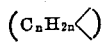

to which is attached a group of atoms characteristic of an ether and another group of atoms characteristic of an ester. The type formula for the molecule is therefore

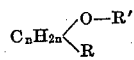

where $n$ stands for a number greater than 1, $R'$ is an alkyl or aryl group and $R$ is an acid group, for example —$OCOCH_3$, $OCOC_2H_5$ or Cl.

Compounds of this class are readily formed by acting on an ether of a glycol with an acid or acid anhydride. Catalysts and dehydrating agents may of course be used following usual practice in esterification. The reaction is represented by the following equation:

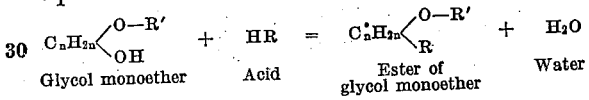

The acetate of the monoethyl ether of ethylene glycol can be prepared in accordance with the method depicted above by treating the ether with a small excess of glacial acetic acid, for example seven moles of acid to six of ether. Heat is applied to start the reaction and a small quantity of sulphuric acid is preferably added as a catalyst. Once started the reaction proceeds energetically and the reacting materials must be cooled to control the action. When reaction is complete the excess acid is neutralized with sodium carbonate and the ester is separated and redistilled. It boils at about 153° C. and has a gravity of 0.982 at 18° C.

The acetate of the monoethyl ether of ethylene glycol is a solvent for cellulose derivatives and for gums, resins, and linseed oil. It is miscible with most common solvents. While it does not dissolve nitrocellulose as readily as does the ether itself, the acetate has the advantage for some uses of being only slightly soluble in water. The ether is miscible with water in all proportions.

In accordance with usual practice in preparing solutions of cellulose derivatives, the solvents of the invention will generally be used in mixture with other solvents.

My invention includes compositions containing, instead of a glycol monoacetate, a compound obtainable by the substitution of an alkyl or aryl group for the hydroxyl hydrogen of a glycol monoacetate an example of which is the acetate of the monoethyl ether of ethylene glycol.

The invention disclosed and claimed herein was disclosed also in my copending application Serial No. 756,815, filed in the United States Patent Office on December 18, 1924.

I claim:

1. A composition of matter comprising a cellulose derivative and a solvent therefor containing a compound having the type formula

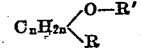

where $n$ stands for a number greater than 1, $R'$ is an alkyl or aryl group, and $R$ is an acid group.

2. A composition of matter comprising a cellulose ester and a solvent therefor containing a compound having the type formula

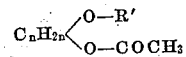

where $n$ stands for a number greater than 1 and $R'$ is an alkyl group.

3. A composition of matter comprising a cellulose ester and a solvent therefor containing a compound having the type formula

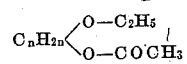

where $n$ stands for a number greater than 1.

4. A composition of matter comprising a cellulose ester and a solvent therefor containing a compound having the type formula $$\begin{array}{c} CH_2-O-R' \\ | \\ CH_2R \end{array}$$

where R' is an alkyl or aryl group and R is an acid group.

5. A composition of matter comprising nitrocellulose and a solvent therefor containing the acetate of the monoethyl ether of ethylene glycol.

In testimony whereof, I affix my signature.

JOSEPH G. DAVIDSON.